United States Patent
Chace et al.

(10) Patent No.: US 8,150,943 B2
(45) Date of Patent: Apr. 3, 2012

(54) METHODS AND APPARATUS FOR DYNAMICALLY GENERATING WEB PAGES

(75) Inventors: Adam Chace, Upton, MA (US); Jason Squatrito, Willington, CT (US)

(73) Assignee: Staples The Office Superstore, LLC, Framingham, MA (US)

( * ) Notice: Subject to any disclaimer, the term of this patent is extended or adjusted under 35 U.S.C. 154(b) by 237 days.

(21) Appl. No.: 11/373,498

(22) Filed: Mar. 10, 2006

(65) Prior Publication Data

US 2007/0214150 A1 Sep. 13, 2007

(51) Int. Cl.
  *G06F 15/16* (2006.01)
  *G06F 7/00* (2006.01)
  *G06F 17/30* (2006.01)
  *G06F 3/00* (2006.01)

(52) U.S. Cl. .................. 709/218; 707/709; 715/745

(58) Field of Classification Search .............. 709/218
  See application file for complete search history.

(56) References Cited

U.S. PATENT DOCUMENTS

| | | | | |
|---|---|---|---|---|
| 5,933,832 A * | 8/1999 | Suzuoka et al. | ............... | 707/101 |
| 6,067,565 A * | 5/2000 | Horvitz | ......................... | 709/218 |
| 6,338,096 B1 * | 1/2002 | Ukelson | ....................... | 719/319 |
| 6,571,279 B1 * | 5/2003 | Herz et al. | ..................... | 709/217 |
| 6,665,659 B1 * | 12/2003 | Logan | ................................. | 1/1 |
| 6,968,380 B1 * | 11/2005 | Singhal et al. | ................ | 709/226 |
| 6,993,586 B2 * | 1/2006 | Chen et al. | ..................... | 709/228 |
| 6,993,591 B1 * | 1/2006 | Klemm | .......................... | 709/232 |
| 7,194,678 B1 * | 3/2007 | Koike et al. | ..................... | 715/234 |
| 7,331,038 B1 * | 2/2008 | Snodgrass et al. | ............ | 717/123 |
| 7,620,653 B1 * | 11/2009 | Swartz | ................................. | 1/1 |
| 2002/0062384 A1 * | 5/2002 | Tso | ............................... | 709/229 |
| 2002/0116585 A1 * | 8/2002 | Scherr | ........................... | 711/133 |
| 2003/0140097 A1 * | 7/2003 | Schloer | ......................... | 709/203 |
| 2004/0015476 A1 * | 1/2004 | Twaddle | ......................... | 707/1 |
| 2004/0128618 A1 * | 7/2004 | Datta | ............................. | 715/513 |
| 2004/0162830 A1 * | 8/2004 | Shirwadkar et al. | ............ | 707/10 |
| 2005/0097008 A1 * | 5/2005 | Ehring et al. | ................... | 705/26 |
| 2005/0108069 A1 * | 5/2005 | Shiran et al. | ....................... | 705/5 |
| 2005/0154781 A1 * | 7/2005 | Carlson et al. | ................ | 709/203 |
| 2006/0253586 A1 * | 11/2006 | Woods | .......................... | 709/226 |
| 2006/0294223 A1 * | 12/2006 | Glasgow et al. | .............. | 709/224 |
| 2007/0100805 A1 * | 5/2007 | Ramer et al. | ..................... | 707/3 |
| 2008/0005695 A1 * | 1/2008 | Ozzie et al. | .................... | 715/811 |
| 2008/0215437 A1 * | 9/2008 | Levy et al. | ...................... | 705/14 |
| 2008/0215614 A1 * | 9/2008 | Slattery | ..................... | 707/103 R |
| 2009/0319177 A1 * | 12/2009 | Khosravy et al. | ............. | 701/207 |

OTHER PUBLICATIONS

A. Ei-Saddik, C. Griwodz, and R. Steinmentz; "Exploiting User Behavior in Prefetching WWW Documents"; Sep. 1998; Lecture Notes in Computer Science, p. 302.*

Anindaya Datta and Kaushik Dutta and Helen M. Thomas and Debra E. VanderMeer and Krithi Ramamritham and Dan Fishman; "A Comparative Study of Alternative Middle Tier Caching Solutions to Support Dynamic Web Content"; 2001; The {VLDB} Journal; p. 667-670.*

* cited by examiner

*Primary Examiner* — Ario Etienne
*Assistant Examiner* — Blake Rubin
(74) *Attorney, Agent, or Firm* — Wolf, Greenfield & Sacks, P.C.

(57) ABSTRACT

One embodiment of the invention is directed to automatically populating the cache of a web server. A webcrawler may send a request for a web page to the web server and receive the web page in response. The webcrawler may locate a link to a second web page in the received web page and determine if the link includes a predetermined pattern of characters. If the link includes the predetermined pattern of characters, the webcrawler may send a request to the webserver for the second web page. In another embodiment, the webcrawler may be made aware of changes to the content of a web site and revisit the web site after changes are made to repopulate the cache with the updated content.

14 Claims, 5 Drawing Sheets

METHODS AND APPARATUS FOR DYNAMICALLY GENERATING WEB PAGES

FIELD OF THE INVENTION

The invention relates to accessing data and, more particularly, accessing data via the world wide web (WWW).

DESCRIPTION OF THE RELATED ART

Figure 1:
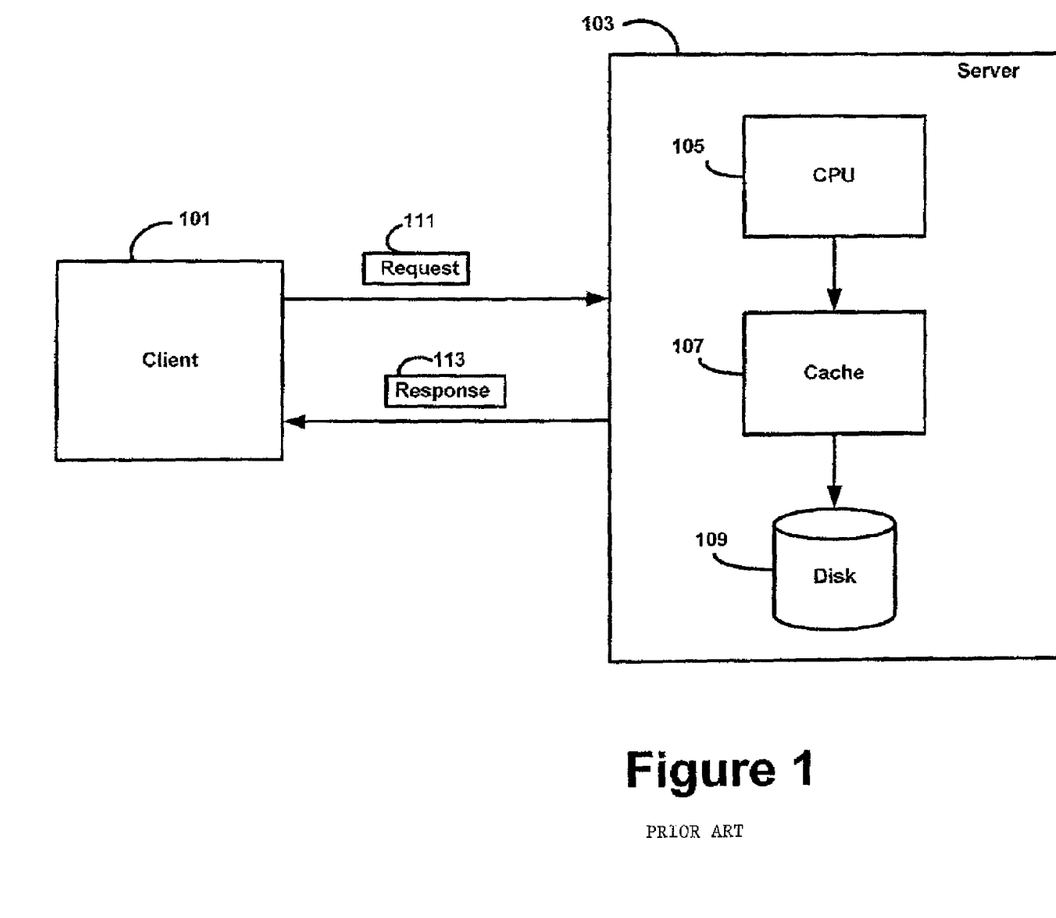
FIG. 1 is a block diagram of a client and a web server.

The World Wide Web (WWW) has a client server architecture, wherein a client sends a hypertext transfer protocol (HTTP) request to a web server and awaits a response. The web server listens for HTTP requests and, when it receives a request, sends a response to the sender. For example, as shown in FIG. 1, client 101 may send a request 111 to server 103 and server 103 may reply with response 113.

Request 111 may identify a particular document stored on server 103 that client 101 wishes to receive. For example, request 111 may request that server 103 send the document index.html. This document may be stored on disk 109 of server 103. When server 103 retrieves the document from disk 109 and provides the document to client 101 (via response 113), server 103 may also store a copy of the document in cache 107. Cache 107 may be a memory that provides faster access to data than disk 109. Thus, the cache may be used to store a portion of the data stored on disk 109 so that if the data stored in the cache is requested by client 101, server 103 need not retrieve it from disk 109, but rather may retrieve it from cache 107 (which provides faster access to the data). The cache is populated with data by client requests. That is, when a client requests a document, the document may be retrieved from disk 109, provided to the client, and stored in the cache. Documents stored in the cache may eventually be removed or replaced with other documents.

Some web servers may dynamically generate documents that are provided in response to client requests. That is, it may be desirable to select the content of a document provided to a client based on information provided in the request. For example, client 101 may send request 111 to server 103, requesting the document index.html. Server 103 may receive the request and, using information provided in the request, generate a document to be provided to client 101 in response to the request.

The generated document may be stored in cache 107 so that if server 103 receives a subsequent request that would result in dynamic generation of the same document, server 103 need not generate the document again. Rather, the document may be retrieved from cache 107. Thus, both previously-created documents and dynamically-generated documents may be stored in cache 107.

SUMMARY

One embodiment of the invention is directed to a method of accessing a plurality of web pages served by a web server, the method comprising: sending a first request to the web server for a first web page of the plurality of web pages; receiving, from the web server, the requested first web page in response to the first request; locating, in the first web page, a link to a second web page of the plurality of web pages; determining whether the link includes a pattern of characters that matches a predetermined pattern of characters; and when it is determined that the link includes the pattern of characters, sending a second request to the web server for the second web page. Another embodiment is directed to at least one computer readable medium encoded with instructions that, when executed on a computer system, perform the above-described method.

A computer system comprising: a web server that provides access to a plurality of web pages; and at least one controller that: sends a first request to the web server for a first web page of the plurality of web pages; receives, from the web server, the requested first web page in response to the first request; locates, in the first web page, a link to a second web page of the plurality of web pages; determines whether the link includes a pattern of characters that matches a predetermined pattern of characters; and when it is determined that the link includes the pattern of characters, sends a second request to the web server for the second web page.

DETAILED DESCRIPTION

Web servers cache requested documents to decrease response time to subsequent access requests for these documents. However, in such web servers, the cache is populated by client access requests. That is, documents (e.g., web pages) are cached in response to a client requesting the document or the document being dynamically generated in response to a client request. Applicants have appreciated that while such a caching technique reduces the response times to subsequent access requests for a previously cached document, it does not provide a decrease in response time to the initial request for the document. That is, because it is the initial request that causes the document to be initially cached, there is no cached copy of the document to be retrieved in response to the initial request and the document must be retrieved from slower storage media (e.g., disk).

Thus, in one embodiment, the cache may be automatically populated with documents before receiving requests from a client. Thus, when a client sends a request for a document, the document may already be cached, even if the request is the initial request for the document.

The cache may be automatically populated in any suitable way, as the invention is not limited in this respect. As used herein, automatic population of the web server cache refers to causing a document (e.g., web pages) to be stored in the cache without a client or human user requesting access to the document.

Figure 2:
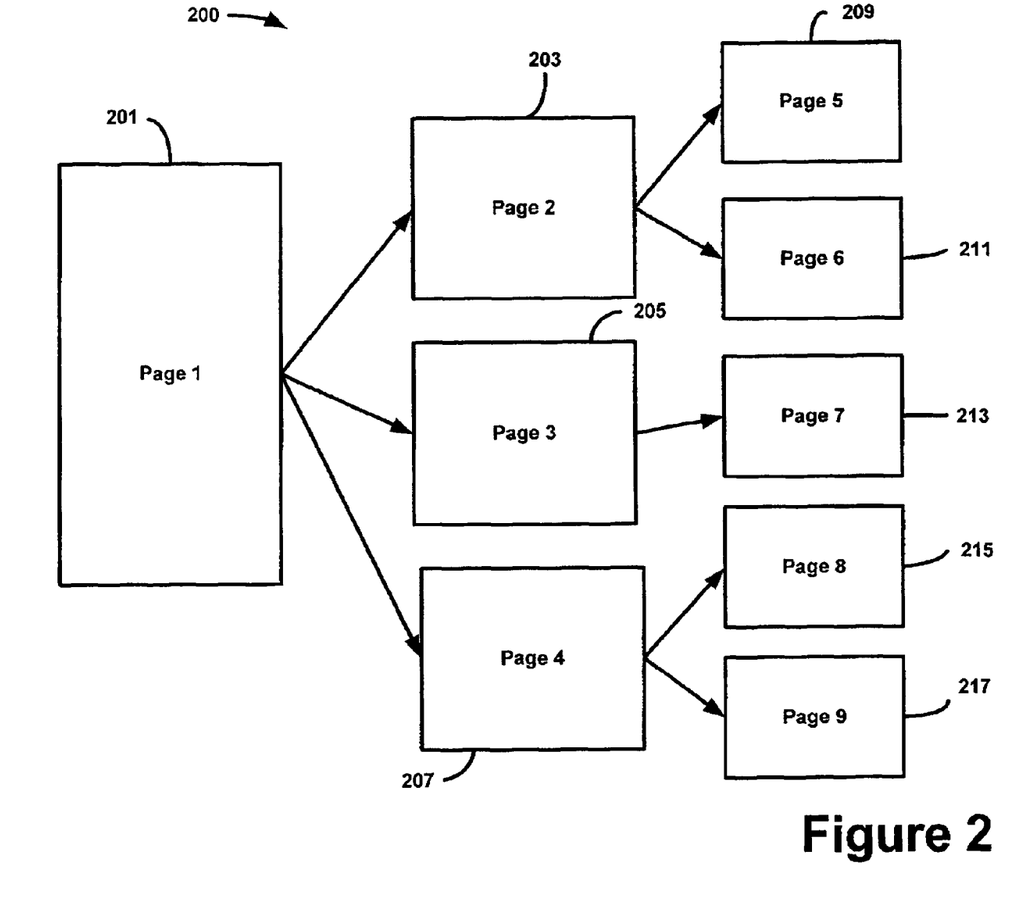
FIG. 2 is a diagram of a web site having a plurality of web pages linked in a hierarchical tree.

In one embodiment, the cache may be populated using a software program referred to herein as a webcrawler. The webcrawler uses the hierarchical structure of a web site to populate the cache. A web site is a collection of web pages, linked together, provided from a single source (e.g., a person or a company). A web page in the web site may also include links (i.e. references) to other websites. For example, as shown in FIG. 2, web site 200 includes nine pages (i.e., pages 201, 203, 205, 207, 209, 211, 213, 215, 217). The content of page 201 includes references, referred to herein as links, to pages 203, 205, and 207. Thus, when a client sends a request for page 201 and receives the page in response to the request, the client may use the links in the content of page 201 to access pages 203, 205, and 207. Page 203 includes links to pages 209 and 211, page 205 includes a link to page 213, and page 207 includes links to pages 215 and 217.

In one embodiment, a webcrawler may automatically populate the cache of a web server by sending a request for the top page in the hierarchy of pages of a web site (e.g., page 201 in web site 200). Requesting access to the top page may cause this page to be stored in the cache of the web server that hosts the web site. The webcrawler may then use the links in the top page to request access to the second-level pages (e.g, pages 203, 205, and 207), thereby causing the second-level pages to be cached on the web server, and may use the links in the second-level pages to request access to the third-level pages (e.g., pages 209, 211, 213, 215, and 217) to cause these pages to be cached on the web server.

In the example above, the webcrawler automatically populates the cache of a web server by accessing each page referenced (i.e., linked to) by another page in a hierarchy of web pages. However, the invention is not limited to use with a web site having web pages linked together in a hierarchy. Indeed, the web pages of the web site may be linked together in any suitable way, as the invention is not limited in this respect. In embodiments where the web pages of a web site are not linked together in a hierarchy, one or more pages of the web site may be designated as the start pages for the website or the webcrawler may select one or more pages of the web site as a start page based on any suitable criteria. The webcrawler may begin populating the cache of the web server by requesting access to the start page or start pages. The webcrawler may then request access to the pages referenced (i.e., linked to) in the start page or start pages. After receiving the pages referenced by the start page or start pages, the webcrawler may request access to the pages referenced by these pages. This process may continue until the webcrawler has accessed all the pages in the web site desired to be cached.

The webcrawler may request access to web pages in a web site in any suitable order, as the invention is not limited in this respect. For example, in one embodiment, the webcrawler may traverse the tree of a hierarchy of pages by starting at the top page and following each path down to a leaf page serially. For example, referring to FIG. 2, after the webcrawler has received page 201, the webcrawler may first request access to page 203, then page 209, and then page 211. Next, webcrawler may request access to page 205, then page 213. Next, webcrawler may request access to page 207, then page 215, and finally page 215.

In another embodiment, the webcrawler may traverse the tree of a hierarchy of web pages one level at a time. For example, the webcrawler, after receiving page 201, the webcrawler may first request access to the pages at the second level (i.e., pages 203, 205, 207) in any suitable order. For example, these pages may be accessed in the order that the links to these pages appear in page 201. Next, the webcrawler may request access to pages at the third level (i.e., pages 209, 211, 213, 215, and 217).

The examples above are only two possible orders in which web pages in hierarchy may be accessed. Indeed, the web pages of web site need not be accessed serially. In some embodiments, the webcrawler may be a multi-threaded software program or may be a parallel program that is capable of requesting access to multiple web pages in parallel. The webcrawler may access the web pages in any other suitable order, as the invention is not limited in this respect.

In the examples above, web site 200 has nine pages arranged in hierarchy having three levels. However, the invention is not limited in this respect, as the web site may have any suitable number of pages. Indeed, in some embodiments of the invention, the web site may include up to 50,000 pages. It should be understood that these web pages may be static web pages (i.e., previously generated), dynamically generated web pages, or any combination thereof. In embodiments where the pages of web site 200 are arranged in hierarchy, the hierarchy may have any suitable number of levels, as the invention is not limited in this respect. Further, though not shown in FIG. 2, in some embodiments pages in the tree may have back pointers to their parent pages. That is, a page may have a link to its parent page. For example, in FIG. 2, page 209 may include a link to page 203. A page in the hierarchy may also have links to one or more of its siblings. For example, in FIG. 2, page 209 may include a link to page 203.

In embodiments where a page may include a link to a reference to another page that has already been accessed by the webcrawler, the webcrawler may recognize that it has previously requested access to the page that is referenced and may ignore the link to that page. Alternatively, the webcrawler may request access to the referenced page again, even though it has already caused the page to be cached.

In the examples above, the webcrawler accesses every page in the web site, causing each page in the web site to be cached. However, the invention is not limited in this respect, as the webcrawler may select only certain web pages to be cached. That is, the webcrawler may access web pages that are desired to be cached and may not access web pages that are not desired to be cached. This may be done in any suitable way, as the invention is not limited in this respect.

Figure 3:
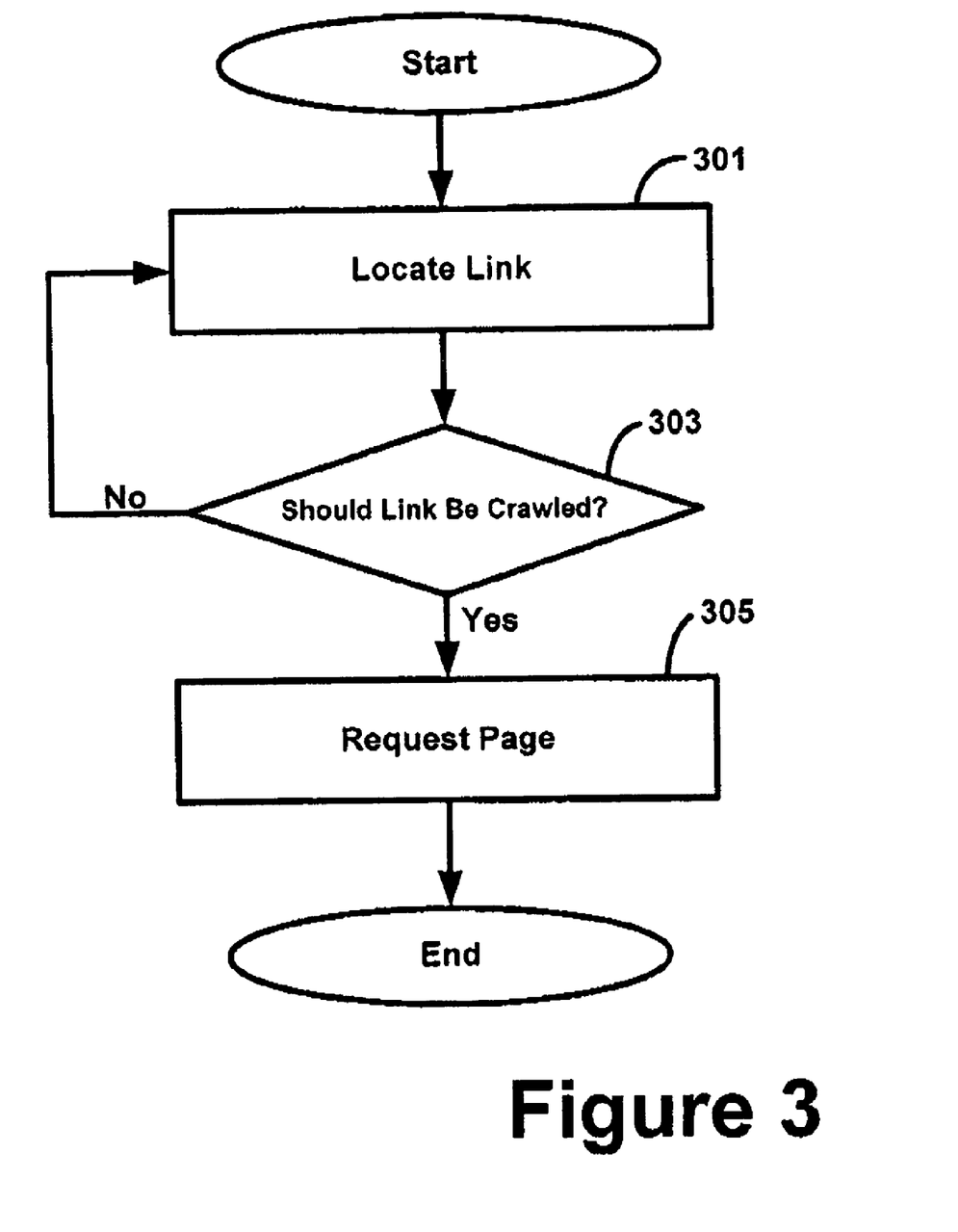
FIG. 3 is a flow chart illustrating a process for selectively caching web pages, in accordance with one embodiment of the invention.

An illustrative process for selectively automatically populating a cache, in accordance with one embodiment, is shown in FIG. 3. At act 301, a link to another page is located in a web page. This may be done in any suitable way (e.g., by parsing the web page that includes the link), as the invention is not limited in this respect. The process continues to act 303, where the webcrawler determines if the located link is a link to be crawled. That is, the webcrawler determines whether to request access to the page, thereby causing it to be cached. As is discussed in greater detail below, the webcrawler may make this determination using any suitable criteria and in any suitable way, as the invention is not limited in this respect. When it is determined that the link is to be crawled, the process continues to act 305, where the webcrawler requests access to the page referenced by the link from the web server. When it is determined that the link is not to be crawled, the process returns to act 301, wherein the webcrawler locates the next link in the web page.

The determination of whether a link is to be crawled may be made in any suitable way, as the invention is not limited in this respect. In one embodiment, the webcrawler may use a set of predefined rules to determine whether to crawl a link. Any suitable rules or criteria may be used, as the invention is not limited in this respect.

For example, the set of rules may include one or more character patterns. If the link includes any of the character patterns, the webcrawler may access the link. In addition to or instead of these character patterns, the set of rules may include one or more character patterns which, if are included in a link, signify to the webcrawler that the link is not to be followed. Another example of a rule that may be used by the webcrawler to determine whether a link should be crawled is to not crawl links that reference web pages from another web site.

The set of rules may be stored in any suitable way, as the invention is not limited in this respect. In one embodiment, the rules are stored in a file that the webcrawler may access and use to determine if a link should be followed. In one embodiment, there may be several rules files that include different rules and the webcrawler may be configured to use a particular file or multiple particular files of the available rules files.

The rules may be devised in any suitable way. For example, the rules may be defined so that pages that are visited less frequently are not accessed by the webcrawler.

Figure 4A:
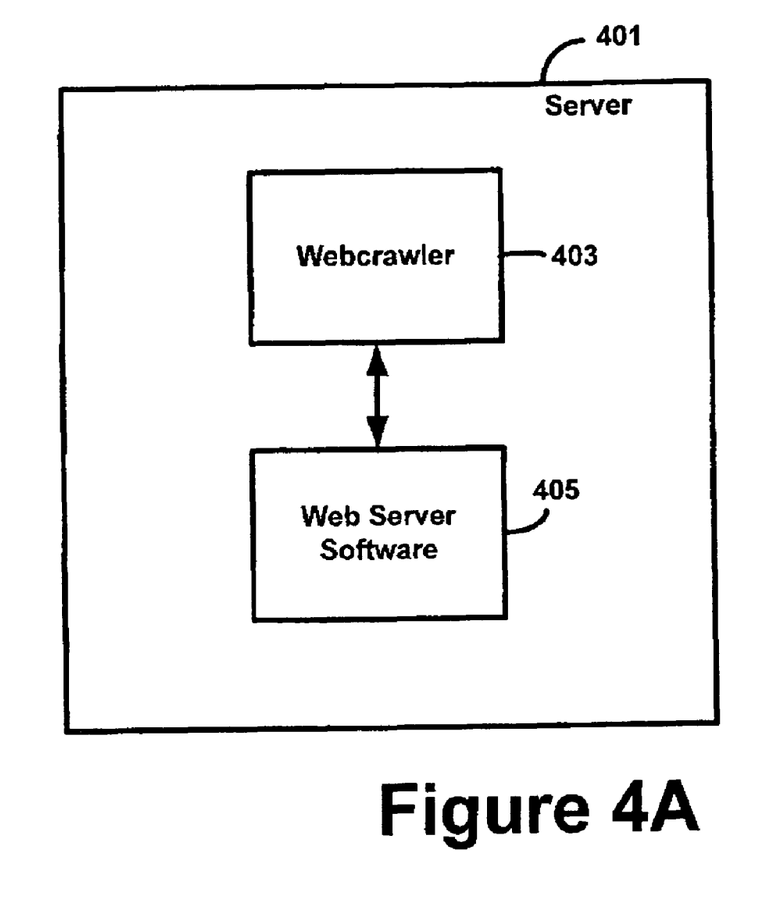
FIG. 4A is a diagram of a webcrawler executing on the same computer as the web server software, in accordance with one embodiment of the invention.

The webcrawler may execute on any suitable computer, as the invention is not limited in this respect. For example, in one embodiment, as shown in FIG. 4A, webcrawler 403 and web server software 405 may both execute on web server 401, which hosts the web site whose pages the webcrawler causes to be cached. Webcrawler 403 may send requests (e.g., HTTP requests) to web server software 405, which serves the pages of the web site, and receive web pages in response to these requests. As discussed above, when webcrawler 403 requests a web page from web server software 405, web server software 405 may cache the requested page.

Figure 4B:
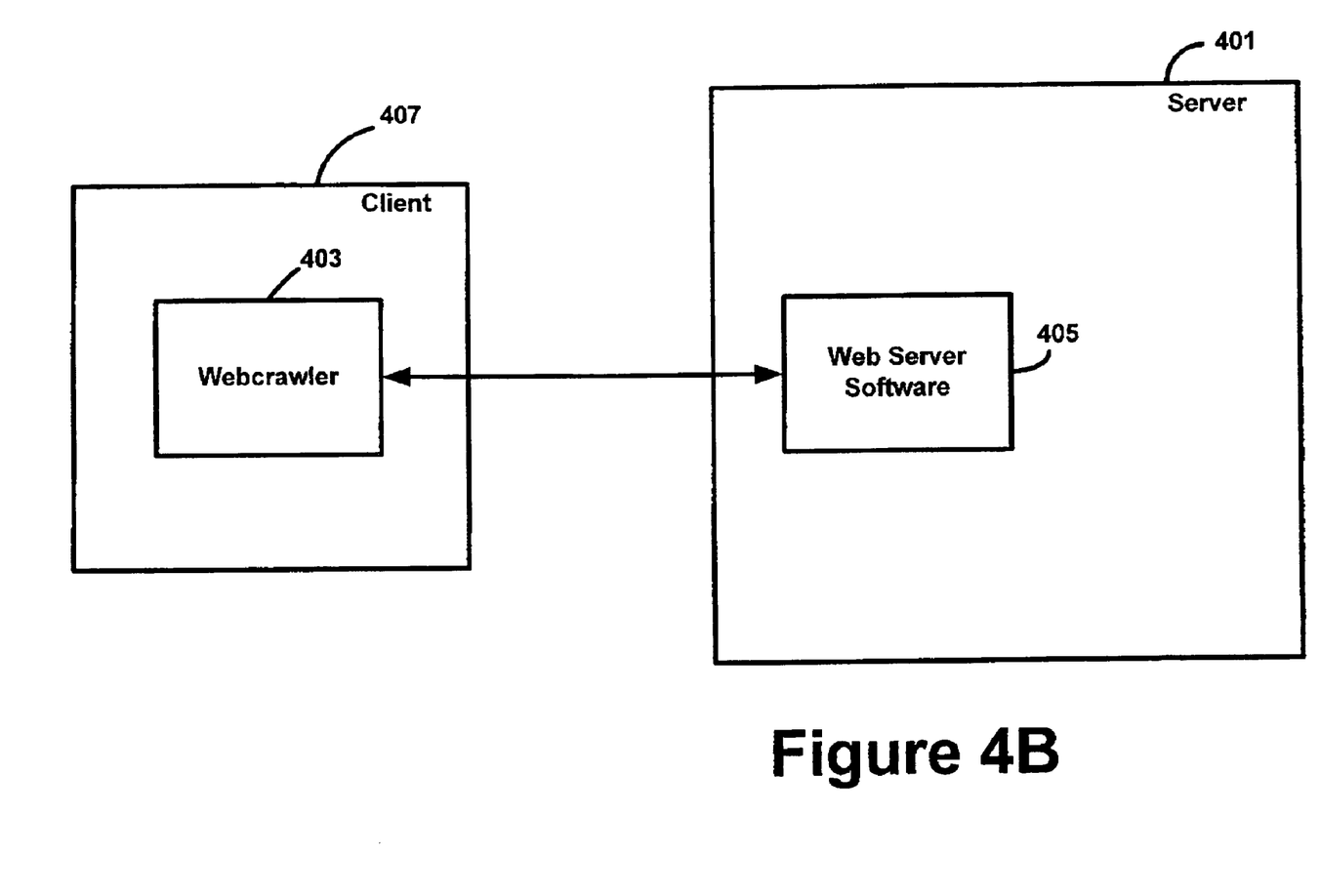
FIG. 4B is a diagram of a webcrawler executing on a different computer from the web server software, in accordance with one embodiment of the invention.

In another embodiment, the webcrawler may execute on a computer separate from the web server that hosts the web site whose pages the webcrawler causes to be cached. For example, as shown in FIG. 4B, webcrawler 403 may execute on client 407 and may send requests (e.g., HTTP requests) to web server software 405, which executes on server 401.

Web server software 405 may be any suitable web server software as the invention is not limited in this respect. As discussed above, web server software may cache web pages that are requested by webcrawler 403. Thus, when the web page is requested by an actual user, the web server software may retrieve the page from the cache, rather than the slower storage media. When the cache is full, the web server software may use any suitable cache replacement scheme to replace web pages in the cache. For example, the web server software may use a least-recently-used (LRU) scheme (wherein the web page that has been accessed the least recently is removed from the cache), a most-recently-used (MRU) scheme (wherein the web page that has been accessed the most recent is removed from the cache), a random scheme (wherein a random page is removed from the cache, or any other suitable scheme.

In some embodiments, when web server software receives a request for a web page from a user, the web server software dynamically generates a web page to return to the user based on characteristics of the user. For example, the user may provide his or her zipcode to the web server software, and the web server software may use this information to determine what content to return to the user. This may be useful, for example, in an e-commerce site where the prices of goods and their delivery time depends on the users location. Thus, the web server software may retrieve pricing and delivery time information from a database that corresponds to the zipcode provided by the user and generate web pages that include this information.

As another example, the web server software may determine what content to include in dynamically generated web pages based on what path the user took to request a certain page. For example, in an e-commerce web site that sells office supplies, a user may request access to a page that displays copy paper in multiple ways. For example, the user may select a link to the page in a menu on another page. Alternatively, the user may reach the page by performing a search using the keyword "paper" and select a link to the page that appears in a page displaying the search results. The web server software may determine what content to include in the web page that displays copy depending on which method the user used to access the page.

The web server may determine what content to include in a dynamically generated web page based on any other suitable user characteristics or criteria, such as, for example, the user's network address (e.g., IP address), the type of web browser that the user is using, any preferences that the user has previously indicated (e.g., font size, color scheme, language, currency, etc.), and/or any other suitable criteria.

In some embodiments, the webcrawler may emulate different user characteristics to cause pages with user-specific content (i.e., pages with content based on the user characteristics) to be dynamically generated and returned by the web server software so that these pages may be cached. This may be done in any suitable way, as the invention is not limited in this respect.

For example, the webcrawler may be configured to provide different zipcodes to the web server software so that web server software generates (and caches) pages with user-specific content for different zipcodes. The webcrawler may similarly emulate any other user characteristic so that web pages that include user-specific content may be dynamically generated and cached.

The webcrawler may crawl a web site at any suitable frequency, as the invention is not limited in this respect. In one embodiment, the webcrawler may be run at a predefined interval, such as for example once per day. That is, the webcrawler may crawl the web site once per day.

In another embodiment, the webcrawler may monitor a database that stores information which the web server software uses to dynamically generate web page. When information in the database changes that would result in the web server software to generate different content in a web page, the webcrawler may crawl the web site so that the web page with updated information is cached. However, if information in the database is updated that would not result in the web serve software generating different content, then the webcrawler may not be run.

For example, in an e-commerce web site, the database may include pricing information for office supplies, such as paper. The web server software may access the database when dynamically generating web pages so that it may provide the price of office supplies in web pages requested by users. If the price of a product is changed in the database, the webcrawler may recognize the change and begin requesting access to web pages (i.e., crawl the web site) so that dynamically generated pages with the updated information are cached.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user and/or via external electrical connection).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of accessing a plurality of web pages served by a web server, the method comprising:
    sending a first request to the web server for a first web page of the plurality of web pages;
    receiving, from the web server, the requested first web page in response to the first request;
    locating, in the first web page, a link to a second web page of the plurality of web pages;
    determining whether the link includes a pattern of characters that matches a predetermined pattern of characters;
    when it is determined that the link includes the pattern of characters, sending a plurality of second request to the web server for the second web page, wherein each of the plurality of second requests includes first information that emulates at least one user characteristic, wherein each of the plurality of second requests provides a different value for the first information that emulates the at least one user characteristic, and wherein each of the plurality of second requests, when processed by the web server, causes the web server to dynamically generate a different version of the second web page that includes content based, at least in part, on the value of the first information that emulates the at least one user characteristic, the web server dynamically generating each different version of the second web page using second information retrieved from a database;
    after sending the plurality of second requests to the web server for the second web page, monitoring the database to determine whether the second information stored in the database has changed;
    when it is determined that the second information stored in the database has changed, determining whether a change to the second information would result in a change to content included in the second web page; and
    when it is determined that the change to the second information would result in a change to content included in the second web page, sending a third request to the web server for the second web page.

2. The method of claim 1, wherein sending the request to the web server for the first web page causes the web server to cache the first web page and sending the plurality of second requests to the web server causes the web server to cache each different generated version of the second web page.

3. The method of claim 1, wherein the at least one user characteristic includes a zipcode.

4. The method of claim 1, wherein the act of sending the third request causes the web server to dynamically generate a version of the second web page that includes the changed second information.

5. At least one non-transitory computer readable medium, encoded with instructions that, when executed on a computer system including a web server, perform a method of accessing a plurality of web pages served by the web server, the method comprising:
    sending a first request to the web server for a first web page of the plurality of web pages;
    receiving, from the web server, the requested first web page in response to the first request;
    locating, in the first web page, a link to a second web page of the plurality of web pages;
    determining whether the link includes a pattern of characters that matches a predetermined pattern of characters; and
    when it is determined that the link includes the pattern of characters, sending a plurality of second requests to the web server for the second web page, wherein each of the plurality of second requests includes first information that emulates at least one user characteristic, wherein each of the plurality of second requests provides a different value for the first information that emulates the at least one user characteristic, and wherein each of the plurality of second requests, when processed by the web server, causes the web server to dynamically generate a different version of the second web page that includes content based, at least in part, on the value of the first information that emulates the at least one user characteristic, the web server dynamically generating each different version of the second web page using second information retrieved from a database;
    after sending the plurality of second requests to the web server for the second web page, monitoring the database to determine whether the second information stored in the database has changed;
    when it is determined that the second information stored in the database has changed, determined whether a change to the second information would result in a change to content included in the second web page; and
    when it is determined that a change to the second information would result in a change to content included in the second web page, sending a third request to the web server for the second web page.

6. The at least one non-transitory computer readable medium of claim 5, wherein sending the request to the web server for the first web page causes the web server to cache the first web page and sending the plurality of second requests to the web server causes the web server to cache each different generated version of the second web page.

7. The at least one non-transitory computer readable medium of claim 5, wherein the at least one user characteristic includes a zipcode.

8. The at least one non-transitory computer readable medium of claim 5, wherein the act of sending the third request causes the web server to dynamically generate a version of the second web page including the change of content that includes the changed second information.

9. A computer system comprising:
a web server operable to provide access to a plurality of web pages; and
at least one controller operable to:
send a first request to the web server for a first web page of the plurality of web pages;
receive, from the web server, the requested first web page in response to the first request;
locate, in the first web page, a link to a second web page of the plurality of web pages;
determine whether the link includes a pattern of characters that matches a predetermined pattern of characters; and
when it is determined that the link includes the pattern of characters, send a plurality of second requests to the web server for the second web page, wherein each of the plurality of second requests includes first information that emulates at least one user characteristic, wherein each of the plurality of second requests provides a different value for the first information that emulates the at least one user characteristic, and wherein each of the plurality of second requests, when processed by the web server, causes the web server to dynamically generate a different version of the second web page that includes content based, at least in part, on the value of the first information that emulates the at least one user characteristic, the web server dynamically generating each different version of the second web page using second information retrieved from a database;
after sending the plurality of second requests to the web server for the second web page, monitor the database to determine whether the second information stored in the database had changed;
when it is determined that the second information stored in the database has changed, determine whether a change to the second information would result in a change to content included in the second web page; and
when it is determined that a change to the second information would result in a change to content included in the second web page, send a third request to the web server for the second web page.

10. The computer system of claim 9, wherein sending the request to the web server for the first web page causes the web server to cache the first web page and sending the plurality of second requests to the web server causes the web server to cache each different generated version of the second web page.

11. The computer system of claim 9, wherein the at least one user characteristic includes a zipcode.

12. The method of claim 1, wherein the act of sending the first request to the web server further comprises automatically initiating sending the first request to the web server, without the first request being initiated by a human user.

13. The method of claim 1, wherein the act of determining whether the link includes a pattern of characters that matches a predetermined pattern of characters further comprises determining, based on a set of configurable rules, whether the link includes the pattern of characters that matches the predetermined characters.

14. The method of claim 1, wherein the information from the database comprises product pricing information.

* * * * *

UNITED STATES PATENT AND TRADEMARK OFFICE
CERTIFICATE OF CORRECTION

PATENT NO.        : 8,150,943 B2
APPLICATION NO.   : 11/373498
DATED             : April 3, 2012
INVENTOR(S)       : Adam Chace et al.

It is certified that error appears in the above-identified patent and that said Letters Patent is hereby corrected as shown below:

At column 7, claim 1, line 47, change "request" to --requests--.

At column 8, claim 5, line 55, change "determined" to --determining--.

At column 9, claim 8, line 7, delete "including the change of content".

At column 10, claim 9, line 7, change "had" to --has--.

Signed and Sealed this
Twenty-ninth Day of May, 2012

David J. Kappos
*Director of the United States Patent and Trademark Office*